United States Patent [19]

Matsuda et al.

[11] Patent Number: 4,932,854
[45] Date of Patent: Jun. 12, 1990

[54] APPARATUS FOR CONTROL OF INJECTION MOLDING MACHINE

[75] Inventors: Kazuo Matsuda, Kyoto; Nobuaki Inaba, Kanagawa; Masashi Kaminishi, Osaka; Tetsuji Funabashi, Osaka; Nobukazu Tanaka, Osaka, all of Japan

[73] Assignee: Kabushiki Kaisha Komatsu Seisakusho, Tokyo, Japan

[21] Appl. No.: 320,264

[22] PCT Filed: Apr. 7, 1988

[86] PCT No.: PCT/JP88/00351
§ 371 Date: Dec. 1, 1988
§ 102(e) Date: Dec. 1, 1988

[87] PCT Pub. No.: WO88/07925
PCT Pub. Date: Oct. 20, 1988

[30] Foreign Application Priority Data

Apr. 7, 1987 [JP] Japan .................................. 62-83727

[51] Int. Cl.$^5$ .............................................. B29C 45/78
[52] U.S. Cl. .................................. 425/144; 264/40.3; 264/40.5; 264/40.7; 425/145; 425/146; 425/170

[58] Field of Search ............... 425/143, 144, 145, 146, 425/149, 150, 170, 171, 588; 264/40.3, 40.5, 40.7

[56] References Cited

U.S. PATENT DOCUMENTS 4,718,841 1/1988 Kiya ..................................... 425/171
4,752,199 6/1988 Arai ..................................... 425/588

FOREIGN PATENT DOCUMENTS 95458 12/1973 Japan .
64337 4/1984 Japan .
242022 12/1985 Japan .

*Primary Examiner*—Jay H. Woo
*Assistant Examiner*—Timothy W. Heitbrink
*Attorney, Agent, or Firm*—Diller, Ramik & Wight

[57] ABSTRACT

A control apparatus for an injection molding machine injects a melted resin within a housing into a cavity of a mold through a nozzle section of a nozzle at a housing and by movement of a screw. A nozzle opening changing mechanism variably changes a throttled path area of the nozzle while a mold temperature sensing mechanism sensing the temperature of the mold. A control mechanism controls the nozzle opening changing mechanism in accordance with the sensed temperature of the mold temperature sensing mechanism.

16 Claims, 8 Drawing Sheets

APPARATUS FOR CONTROL OF INJECTION MOLDING MACHINE

TECHNICAL FIELD

The present invention relates to apparatus for control of an injection molding machine which injects a melted resin into the cavity of a mold to form plastic moldings.

BACKGROUND ART

In an injection molding machine, a plastic material plasticized in an elongated cylinder is injected through a nozzle by rotational movement of a screw to fill the cavity of a mold with the plastic material. Thereafter, when the plastic material in the mold is cooled and set, the molding is taken out by opening the mold.

A programmed injection process which controls the injection velocity is known as a conventional technique according to an injection control method in an injection molding machine of this type. This method includes instead controlling the moving velocity of the screw in order to control the injection velocity from the nozzle, namely, the flow velocity of the resin into the mold wherein the moving velocity of the screw is controlled in a plurality of stages. This technique is disclosed in, for example, Published Unexamined Japanese Patent Applications (Tokkaisho) Nos. 48-95458 and 59-64337.

In these conventional techniques, however, since the diameter of the nozzle opening is constant, a change in the injection velocity causes the heating value produced by shearing of the resin at the nozzle to be changed. Thus even if only the injection velocity is desired to be changed, the resin temperature is also changed together, so that the controlled factors are complicated and control is difficult.

Another conventional technique (Published Unexamined Japanese Patent Application (Tokkaisho) No. 60-242022 discloses a throttled path portion provided at the nozzle end. The opening of the throttled path portion is changed in injection to change the heating value produced by shearing at the nozzle to thereby provide a desired resin temperature. In order to only eliminate uneven distribution of temperature of the resin varying depending on the position of the screw stroke, this technique variably controls the opening of the nozzle valve in accordance with the position of the screw to thereby maintain the temperature of the injected resin at a constant temperature. However, in order to provide such control, it is necessary to accurately understand at all times the distribution of the resin temperature along the axis of the screw before the injection step starts. To this end, a troublesome pre-process must be performed which includes sensing the distribution of the resin temperature, knowing the average distribution of temperature by many experiments, etc., so that this technique is problematic from a standpoint of accurate control of temperature, working efficiency and practicality.

For control of even resin temperature in injection molding, the factors which change the resin temperature include the temperature of a mold used in addition to the heating due to shearing at the nozzle section which is due to a change in the injection velocity. If the temperature of the mold fluctuates, the temperature of the melted resin filled in the cavity fluctuates correspondingly, the specific volume of the resin also fluctuates, and hence the resulting product fluctuates in dimension.

As a prior art which has percieved the temperature of a mold, there is known a molding control method which includes the steps of calculating the correlation between the temperature (or the resin temperature) and the resin pressure, sensing the actual mold temperature (or the actual resin temperature) in the injection molding and controlling the resin pressure. For example, the pressure is decreased in order to decrease the resin pressure by a quantity corresponding to a decrease in the mold temperature (or the resin temperature).

Such molding control method is much troublesome, its accuracy is low and not an optimal molding control method. Namely, if the resin pressure is changed, the distribution of internal stress in the mold will change and bad products may result undesirably.

If the mold temperature (or resin temperature) fluctuates, it is conceivable to control the temperature of the housing in accordance with that fluctuation to directly correct the resin temperature, but the temperature responsive rate of the housing is greatly low compared to molding cycle rate, so that such control is not effective practically.

If the mold temperature mold is controlled precisely so as not to fluctuate, stabilized molding can be performed. However, the mold temperature varies depending on the atmospheric temperature, so that the temperature within a factory in which the injection molding machine is installed must be controlled at a constant temperature in order to control the mold temperature precisely, and therefore the control would be expensive and not practical.

The present invention derives from the contemplation of such situations. It is an object of the present invention to provide a control apparatus for an injection molding machine which is capable of controlling the injection velocity and the resin temperature separately to thereby facilitate the molding operation, and to manufacture precise and uniform moldings.

It is another object of the present invention to provide a control apparatus for an injection molding machine which is capable of maintaining the specific volumes of resin uniformly at all times at injection irrespective of fluctuations of the mold temperature to thereby provide precise stabilized moldings successively.

DISCLOSURE OF THE INVENTION

In the present invention, the correlation among the opening of a nozzle and physical variables corresponding to the heating value of a melted resin produced by shearing at the nozzle section and the injection velocity (the screw velocity, resin temperature at the nozzle section) is calculated quantitatively, and the opening of the nozzle is variably controlled in accordance with changes in the physical variables corresponding to the injection velocity in order to control the injection velocity and the resin temperature independent of each other. Thus, it is possible to change the resin temperature by maintaining the injection velocity at constant value or to change the injection velocity by maintaining the resin temperature at constant value to thereby facilitate the molding operation and to provide precise stabilized moldings.

In the present invention, the nozzle opening is variably controlled in accordance with a change in the mold temperature to change the frictional heat (the heating value produced by shearing) of the resin passing through the nozzle to thereby maintain the specific volumes of the resin at a constant value at all times irrespective of changes in the mold temperature and to precisely stabilize the qualities of moldings succesively and to reduce the cost. When the mold temperature is low compared to a preset reference temperature, the area of the nozzle opening is decreased while when it is high, the area of the opening is increased to thereby control the frictional heat of the melted resin passing through the nozzle.

BEST MODE FOR CARRYING OUT THE INVENTION

The present invention will now be described in detail with respect to one embodiment thereof shown in the accompanying drawings.

Figure 1:
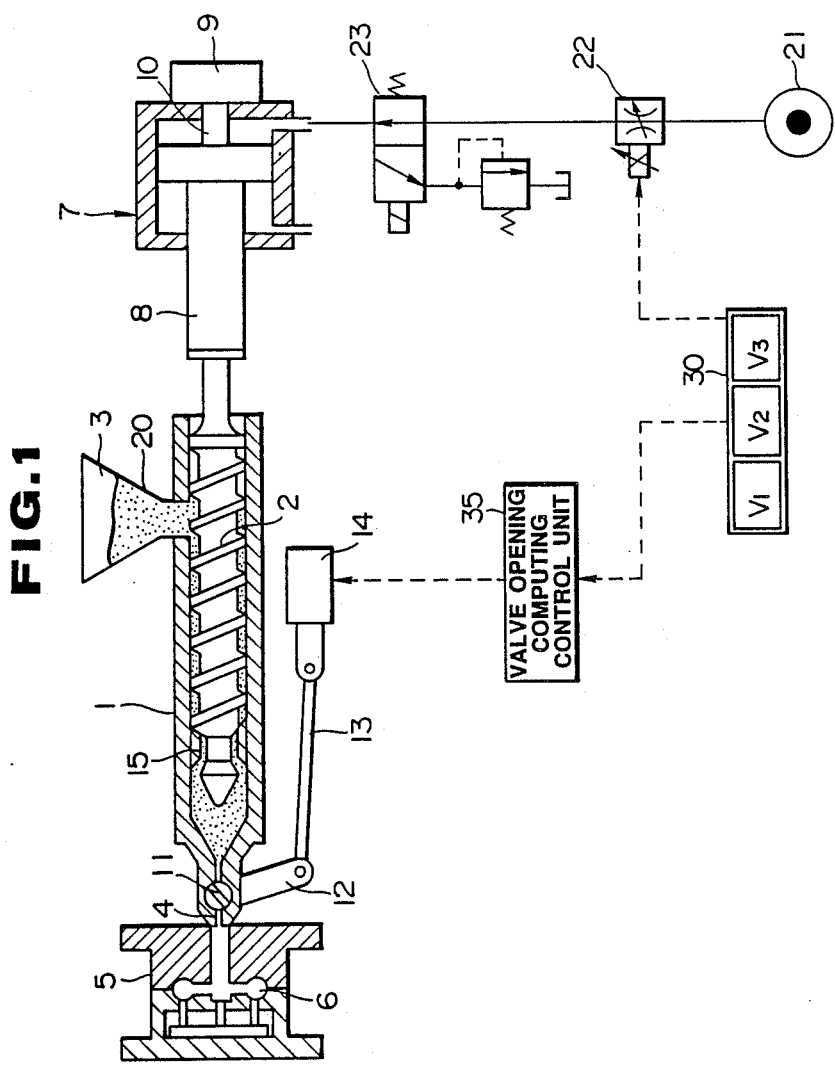
FIG. 1 is a control block showing a first embodiment of the present invention.

FIG. 1 shows a first embodiment of the present invention. The injection apparatus includes a cylindrical housing 1 in which a screw 2 is inserted slidably and rotationally such that a resin 20 within a hopper 3 is melted and that the cavity 6 of a mold 5 is filled with the melted resin injected through the nozzle 4. The screw 2 is coupled to a piston rod 8 in an injection cylinder 7. A drive shaft 10 rotated by a hydraulic motor 9 is splined to the piston rod 8 to thereby rotate the screw 2 and move same in the direction of injection.

The nozzle 4 has a flow velocity control mechanism which controls the opening area of the nozzle, for example, a nozzle valve 11 which is coupled through a link mechanism including a lever 12 and a rod 13 to a nozzle valve driver, for example, a proportional solenoid 14. By controlling an electric current supplied to the solenoid 14, the opening of the nozzle valve 11 is changed to thereby control the opening area of the nozzle 4. Reference numeral 15 denotes a check valve.

A hydraulic oil is fed to the injection cylinder 7 from a pump 21 via a flow control valve 22 and a directional changeover valve 23. The flow control valve 22 is an electromagnetic type flow velocity control valve which variably controls a flow velocity of oil which supplied to the cylinder 7 in accordance with an electrical command issued by an injection velocity setting unit 30 to thereby generate a screw velocity corresponding to the input command.

Set at the injection velocity setting unit 30 are three screw velocities V1, V2 and V3 in the instant case such that the screw velocity can be controlled variably in three stages of V1, V2 and V3 in a single injection process. The output from the injection velocity setting unit 30 is also input to a valve opening computing control unit 35 in addition to the flow control valve 22.

The valve opening computing control unit 35 calculates the opening of the nozzle valve corresponding to the screw velocity, data on which the control unit 35 has received, and provides the result of the calculation to the nozzle valve driver 14 to variably control the opening of the nozzle valve 11. Before describing the detailed structure of the control unit 35, the principle of the invention will be described.

As mentioned above, when the melted resin 20 to be injected passes through the nozzle 4, its temperature is increased due to frictional heat. The frictional heat $\Delta T$ is given by the following equation (1):

$$\Delta T = A \cdot W \cdot \Delta P / Cp \qquad (1)$$

where A is the thermal equivalent of work;

W is the specific volume of the resin at an absolute temperature of 0° K.;

Cp is a specific heat at constant pressure; and $\Delta P$ is the difference in pressure through the throttled path portion.

The flow velocity (injection velocity) VR of the resin passing through the throttled path portion 4 is given by $$VR = a \cdot P^{1/n} \qquad (2)$$

where a and 1/n are constants determined by the resin.

From equations (1) and (2), $$\Delta T = A \cdot W \cdot (VR/a)^n / Cp \qquad (3)$$
$$= K \cdot VRn$$

where $K = A \cdot W \cdot (1/a)^n Cp$.

Therefore, the frictional heat $\Delta T$ of the melted resin at the throttled path portion is represented by the product of a proportional constant K and the $n^{th}$ power of the flow velocity VR of the resin passing through the nozzle.

In the injection molding machine, the flow velocity (injection velocity) VR of the resin at the nozzle section 4 due to the movement of the screw 2 within the housing 1 is given by $$VR = \frac{AS}{AN} \cdot VS \qquad (4)$$

where

AS is the sectional area of the housing,

VS is the moving velocity of the screw, and

AN: the throttled path area of the nozzle.

Therefore, from equations (3) and (4), $$\begin{aligned} T &= K \cdot VR^n \\ &= K \cdot \left( \frac{AS}{AN} \cdot VS \right)^n \\ &= \alpha \cdot \left( \frac{AS}{AN} \cdot VS \right)^n \end{aligned} \qquad (5)$$

where $= K \cdot AS^n$.

It will be understood from equation (5) that if the screw diameter (the sectional area AS of the housing) and the resin characteristics (W, Cp, a, 1/n) are determined, the heating value $\Delta T$ produced in the melted resin passing through the nozzle 4 is determined by the moving velocity of the screw VS and the trottled path area of the nozzle AN.

Figure 2:
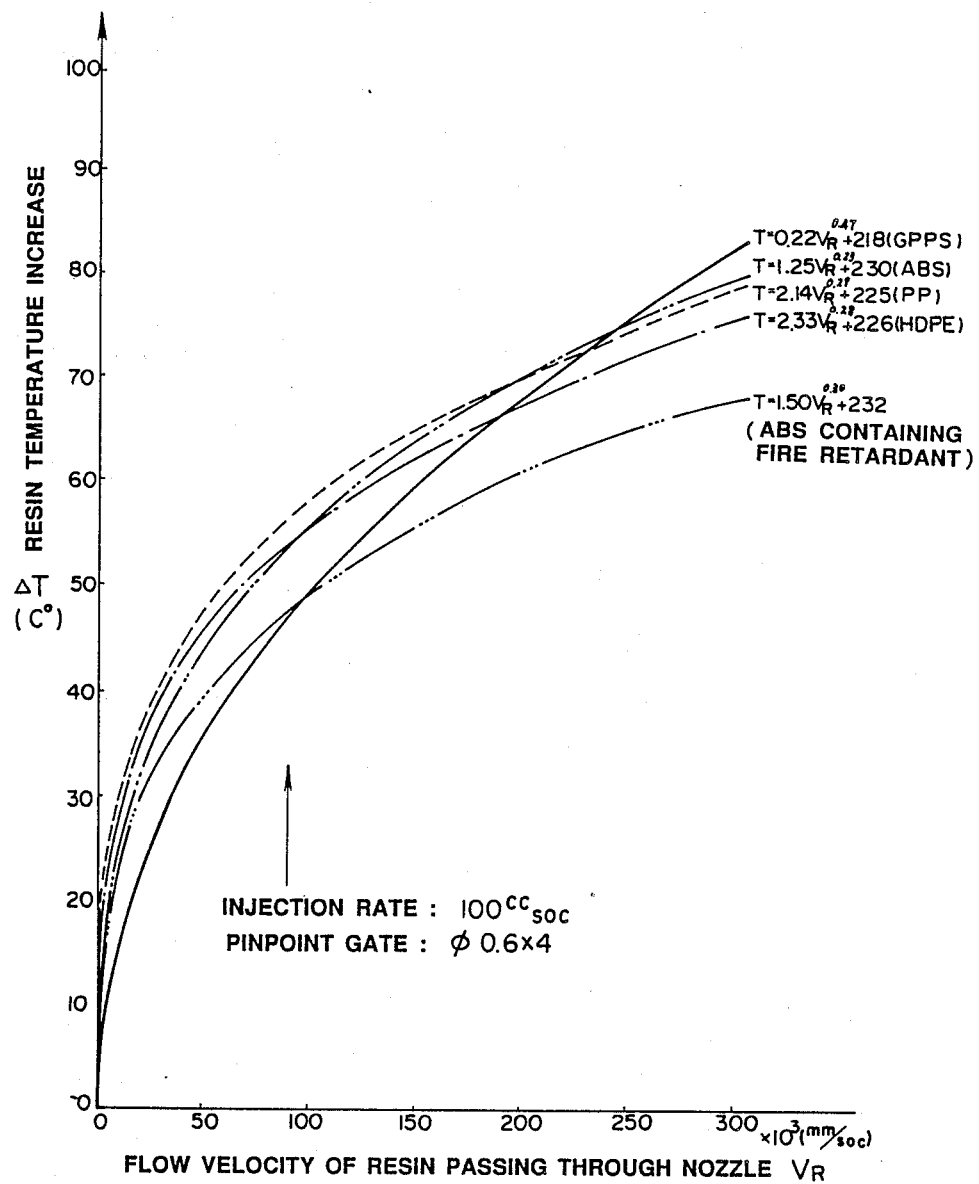
FIG. 2 is a graph showing the relationship between increasing temperature of the resin and flow velocity of the resin passing through the nozzle.

FIG. 2 show experimental data on the relationship between $\Delta T$ and VR with five kinds of resins such as GPPS, ABS, etc., used as parameters wherein VR is calculated using equation (4) and Ts show the respective actual temperatures of the resins.

It is well-known in the injection molding machine that the injection velocity VR of the resin at the nozzle (the flow velocity per unit hour of the resin passing through the nozzle valve) and the temperature T of the melted resin greatly influence the appearance, etc., of moldings. As will be seen in the second graph, if the injection velocity PR is changed, the resin temperature T is also changed, so that VR and T cannot be controlled separately by regular control.

In equation (5), the frictional heat $\Delta T$ at the nozzle section is given as a ratio of the screw moving velocity VS to the throttled path area of the nozzle AN. The screw moving velocity VS is proportional to the injection velocity VR. Therefore, in order that the resin temperature T is maintained constant irrespective of changes in the injection velocity VR, the throttled path area of the nozzle AN should be changed such that VS/AN=constant in equation (5) in accordance with changes in the screw moving velocity VS. If VS increases, AN should be increased such that VS/AN=constant whereas if VS decreases, AN should be decreased such that VS/AN becomes constant.

Thus it is possible to separately control the injection velocity VR and the resin temperature T as the respective independent parameters.

Figure 3:
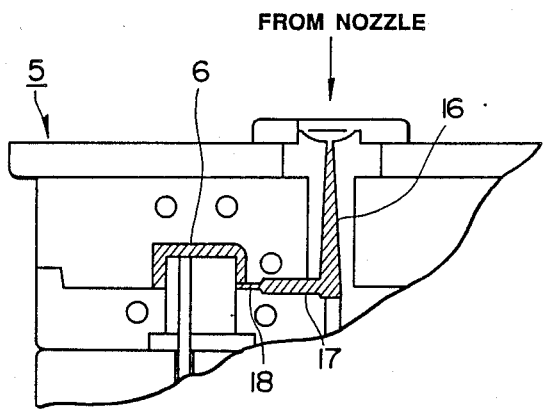
FIG. 3 is a partial cross section view of the detailed structure of a mold.

The above principle is the control performed in consideration of only the frictional heat at the nozzle section 4. As shown in FIG. 3, in the regular injection machine, the resin passing through the nozzle 4 into the mold 5 further passes through a sprue 16, a runner 17 and a so-called gate 18 having a reduced cross section area into the cavity 6.

Therefore, the total frictional heat value $\Delta T'$ of the frictional heat value $\Delta T$ at the nozzle section 4, and the frictional heat value $\Delta Ta$ produced at the sprue, runner and gate is given by the following equation (6):

$$\Delta T' = \Delta T + \Delta Ta$$
$$= \alpha \left( \sum_i \left( \frac{VS}{Ai} \right)^n + \left( \frac{VS}{AN} \right)^n \right)$$
$$= \alpha (\beta + AN^{-n}) VS^n \quad (6)$$

where $$\beta = \sum_i Ai^{-n},$$

i=the number of throttled path portions at the sprue, runner and gate section, and Ai is a respective one of the sectional areas of the throttled path portions of the sprue, runner and gate section.

Since in equation (6), $\beta$ becomes constant if the mold is determined, $\Delta T'$ also becomes a function of AN and VS. If the throttled path area AN of the nozzle valve is controlled such that $(\beta + AN^{-n})VS^n$ is maintained constant even if the injection velocity VS changes, the temperature of the resin which passes through the gate section 18 into the cavity 6 can be controlled constant at all times.

While the above example presupposes that control is free from the influence of the mold temperature, the melted resin actually flows into the mold while being cooled by the mold. Therefore, when the injection velocity is low, the melted resin is further cooled and therefore, it is difficult to maintain constant the temperature of the resin flowing into the mold cavity 6 in spite of changes in the injection velocity by relying only on the above control. Therefore, if the injection velocity decreases, the nozzle area should be throttled by a quantity corresponding to a decrease in the resin temperature due to the mold cooling.

In more detail, control will be described using equation (6). Control should be provided which includes throttling the opening slightly more than the opening of AN which maintains $(\beta + AN^{-n})VS^n$ constant, namely, the control of the AN value such that $(\beta - \gamma + AN^{-n})VS^n$ is maintained constant where $\gamma$ is a value to cause an excessive heating value at the nozzle section.

While the above is intended to maintain the heating value constant, it is possible to control the heating value of the resin freely to a desired value for the screw velocity VS if $(\beta - \gamma + AN^{-n})VS^n$ is controlled so as to be maintained constant and if the $\gamma$ value is variably set simultaneously.

In the embodiment of the apparatus shown in FIG. 1, the resin temperature is maintained at a predetermined temperature by controlling variably the opening of the nozzle valve 11 in accordance with changes (V1, V2 or V3) in the moving velocity VS of the screw 2 on the basis of the principle mentioned above. In the injection process, the velocity signals V1–V3 from the injection velocity setting unit 30 are also delivered sequentially to a nozzle valve opening control unit 35 where the throttled path area of the nozzle valve 4, AN=f(Vn)(Vn: V1, V2, V3), corresponding to the velocities V1–V3 of the screw 2, are sequentially calculated and a command is given for the nozzle valve driver 14 to provide a quantity of ristriction corresponding to the value of AN. The method of setting the function AN=f(Vn) includes a process for determining AN so as to maintain VS/AN constant on the basis of equation (5), a process for determining AN so as to maintain $(\beta + AN^{-n})VS^n$ constant on the basis of equation (6) or a process for determining AN so as to maintain $(\beta - \gamma + AN^{-n})VS^n$ constant. The constants $\alpha$, $\beta$, $\gamma$, and $1/n$ necessary for calculation should be experimentarily calculated beforehand for setting the functions.

Since in the particular embodiment the opening of the nozzle valve 11 is variably controlled such that the resin temperature is maintained at a predetermined temperature in accordance with a change in the setting points V1–V3 for the moving velocities of the screw 2, the temperature of the melted resin passing through the nozzle valve is automatically controlled and therefore the temperature of the melted resin flowing into the mold cavity is controlled with high operability. Since the molding temperature of the resin is high; namely, 350°–500° C., in recent superempler molding, special materials are required for the housing 1 of the injection machine. In contrast, according to the particular embodiment, the temperature of the melted resin passing through the nozzle valve can be freely control. For example, the temperature of the melted resin within the housing 1 can be set at a low temperature; namely, at 300°–350° C., to thereby achieve a desired molding temperature using the frictional heat produced by the resin. Thus, the housing temperature can be set low and it is unnecessary to use special materials for the housing to thereby perform inexpensive superempler molding. Since the heat generation by the resin is performed instantaneously at the nozzle valve, there is not problem about the stagnation of heat within the housing 1, and scorch, silvering, black streak, discoloration, deterioration, etc., can be prevented to thereby allow mass production which provides good products molded in a stabilized manner.

In the particular embodiment, the screw velocity VS is substituted for the injection velocity VR. The injection velocity VR means the velocity at which the resin flows into the mold cavity 6 from the nozzle 4, and the relationship between the injection velocity VR and the screw velocity VS is given by equation (4) as mentioned above;

$$VR = \frac{VS}{AN} \cdot VS$$

The nozzle diameter may change in accordance with a mold used, in which case the screw velocity VS is substituted for the injection velocity VR.

Figure 4:
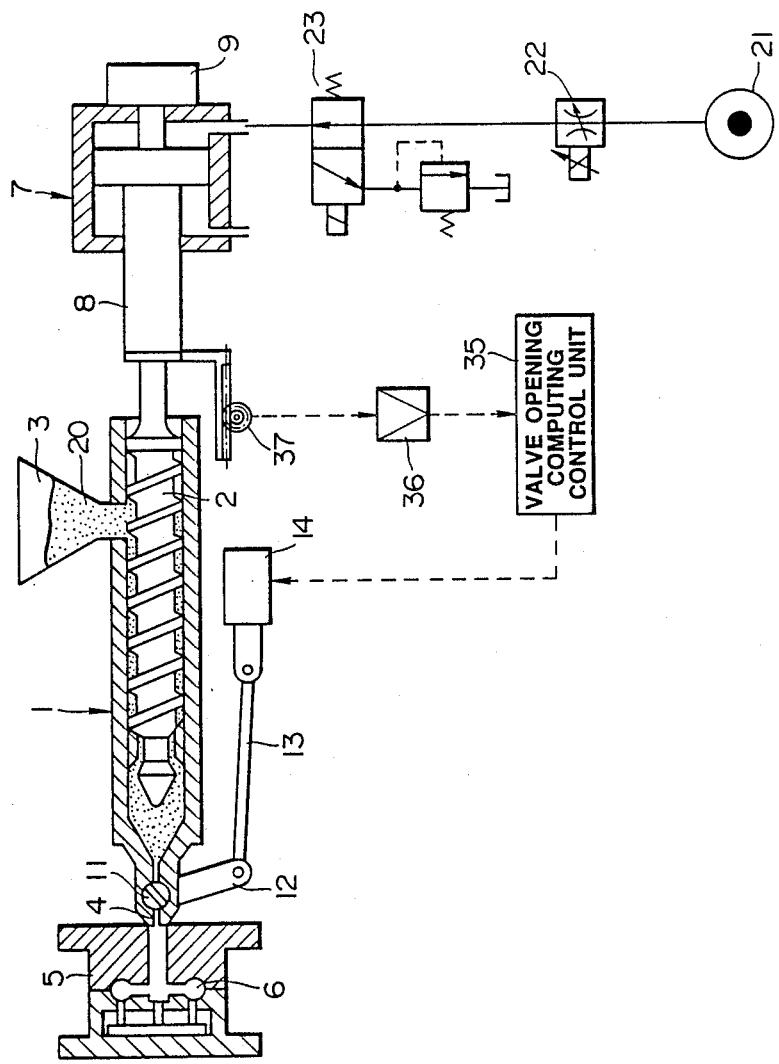
FIG. 4 is a control block diagram showing a second embodiment of the present invention.

FIG. 4 shows a second embodiment of the present invention. While in the first embodiment a setting point (a desired value) for the controlled screw velocity system is used as the screw velocity VS, the actual sensed value is used as the screw velocity VS in the second embodiment shown in FIG. 4.

The valve opening computing control unit 35 receives a sensed value indicative of the moving velocity VS of the screw 3 sensed by a screw velocity sensor 37 via an amplifier 36. The valve opening computing control unit 35 performs calculations similar to those mentioned above in accordance with the sensed value to calculate the screw opening AN corresponding to the sensed value, and controls the opening of the nozzle valve 11 variably in accordance with the calculated value to thereby maintain the resin temperature at a desired temperature.

Since in the injection molding machine the temperature of the resin passing through the nozzle valve 4 is raised due to frictional heat, it is possible to know the injection velocity VR indirectly by sensing the temperature T of the resin having passed through the nozzle valve 4. Therefore, arrangement may be such that by sensing the temperature of the resin having passed through the nozzle valve, a quantity of restriction to the nozzle valve 4 is controlled in accordance with the sensed value of the resin temperature.

Figure 5:
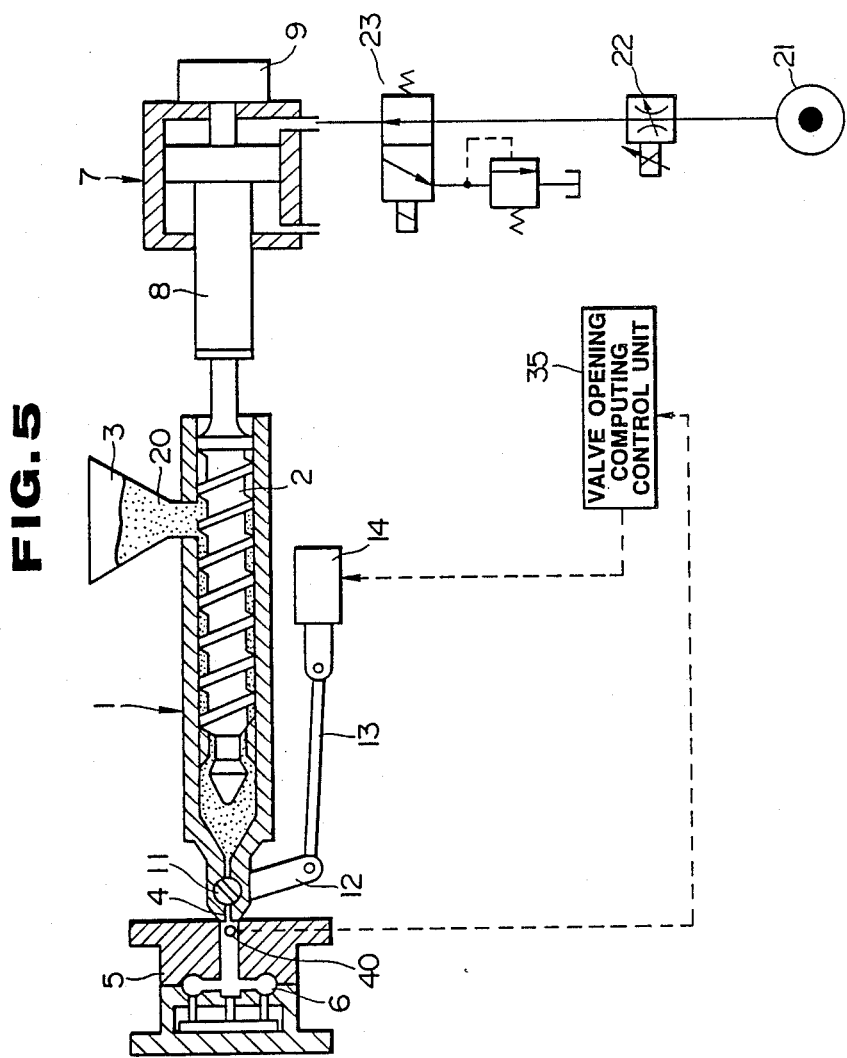
FIG. 5 is a control block diagram of a third embodiment present invention.
Figure 6:
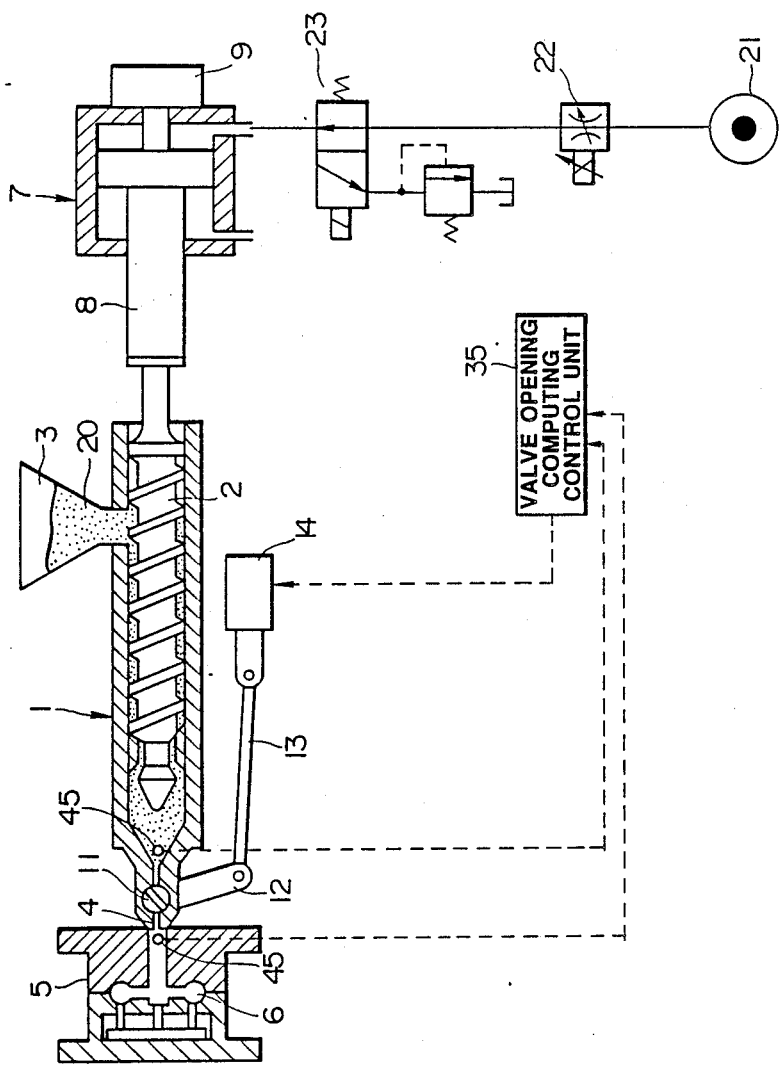
FIG. 6 is a control block diagram of a fourth embodiment present invention.

In order to sense the resin temperature, (1) as shown in a third embodiment of FIG. 5, a resin temperature sensor 40 may be provided in the nozzle valve 4 or in the mold cavity 6; (2) as shown in a fourth embodiment of FIG. 6, a pressure sensor 45 may sense the difference between the pressures before and after the throttled path portion of the nozzle valve 4 or the difference between the pressure before the throttled path portion of the nozzle valve 4 and the pressure of the resin in the mold (pressure loss) to calculate the heating value due to friction of the resin, or (3) the heating value due to friction of the resin may be calculated from the injection velocity VR.

Figure 7:
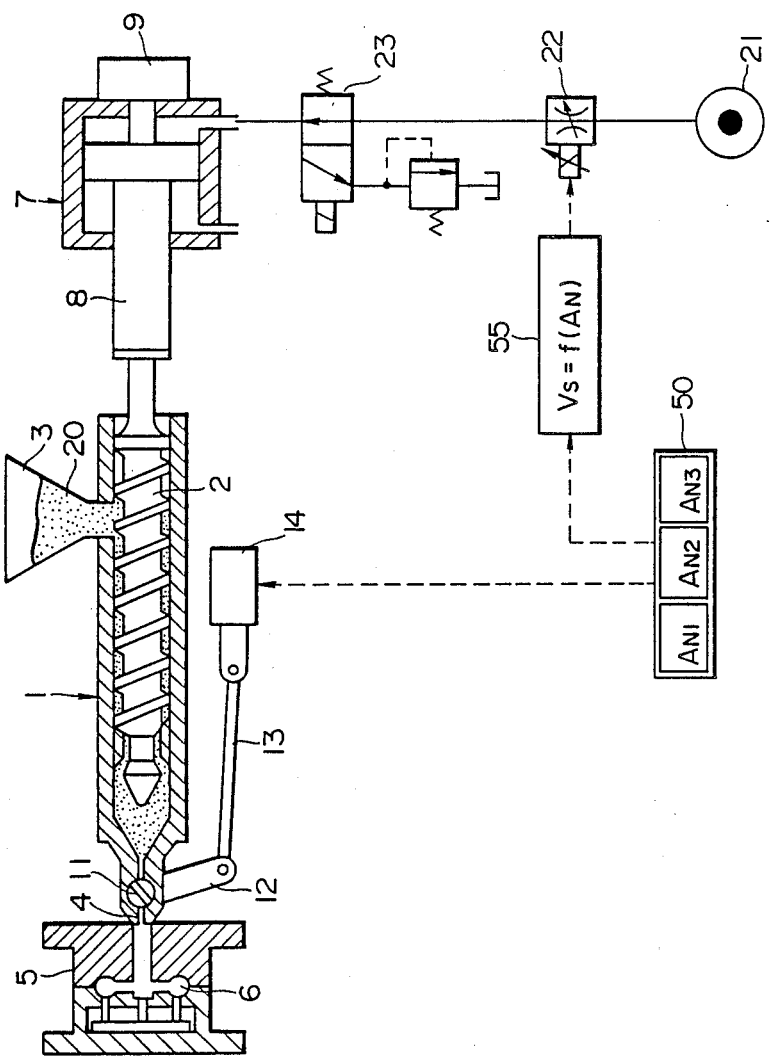
FIG. 7 is a control block diagram of a fifth embodiment present invention.

FIG. 7 shows a fifth embodiment of the present invention which includes a nozzle opening setting unit 50 in which setting points (three, in the particular case) $AN_1$, $AN_2$, and $AN_3$ are set for the nozzle opening AN in a single injection process to control the nozzle valve driver 14. The setting points $AN_2$–$AN_3$ each are input to an injection velocity control unit 55 which performs an inverse conversion $VN = f^{-1}(AN)$ of the operation $AN = f(Vn)$ by the valve opening computing control unit 35 of the first embodiment. The input valve opening setting points $AN_1$, $AN_2$ and $AN_3$ each are converted to the corresponding screw velocities VS with the resin temperature maintained constant on the basis of the expression (5) or (6), and the converted values VS each are input to the flow control valve 22. The fifth embodiment includes mere replacement, with another one, of the relationship between the injection velocity setting unit 30 and the nozzle valve opening control unit 35 of the first embodiment to thereby provide effects similar to those provided by the first embodiment.

Figure 8:
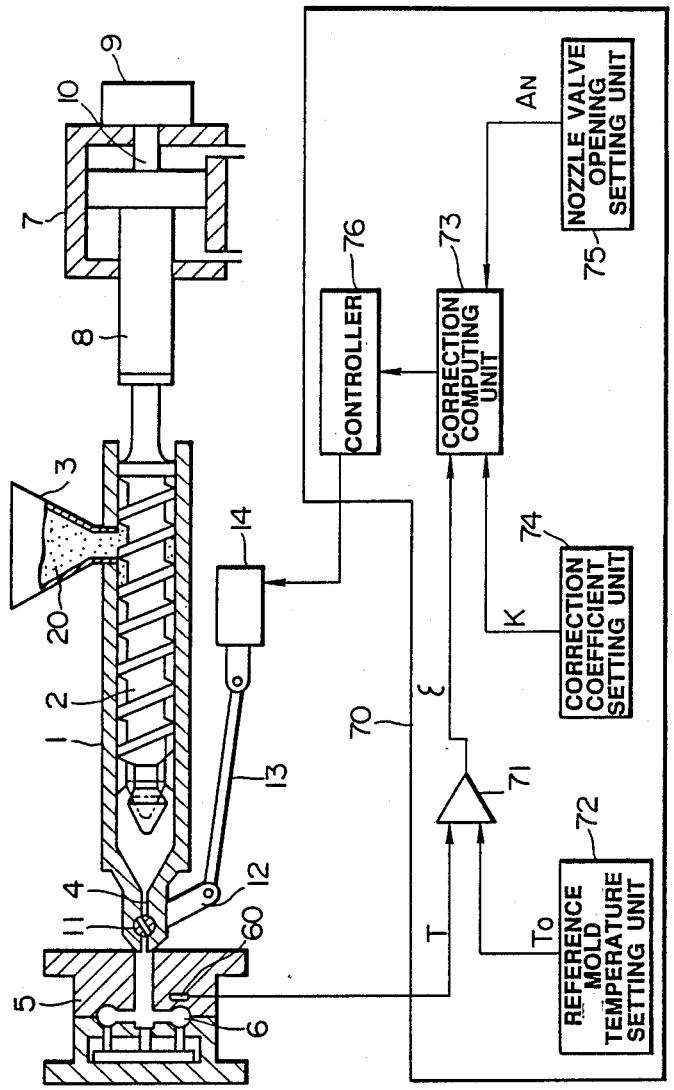
FIG. 8 is a control block diagram of a sixth embodiment present invention.

FIG. 8 shows a sixth embodiment of the present invention which includes a mold temperature sensor 60 provided in the mold 5. The sensed temperature T from the sensor 60 is delivered to a comparator 71 of a controller 70 where it is compared to a reference temperature $T_0$ set at a reference mold temperature setting unit 72. The deviation $\epsilon$ is delivered to a correction computing unit 73 to calculate a correction value using a correction coefficient k set at a correction coefficient setting unit 74 and a set opening AN at a nozzle valve opening setting unit 75 and delivers the resulting correction value to a controller 76, which then feeds a control current to the proportional solenoid 14 to change the opening of the nozzle valve 11.

Now the operation of the sixth embodiment will be described. First, the mold 5 is heated to a temperature set by a heater or the like built in the mold 5 and the nozzle valve 11 is controlled so as to have a set opening AN set at the nozzle valve opening setting unit 75.

The temperature of the mold 5 during molding is sensed by a mold temperature sensor 60, the output from which is then input to the controller 70. When the sensed temperature T is equal to a reference temperature $T_0$, the deviation $\epsilon$ is 0, so that the nozzle valve opening is equal to the set opening AN.

When the sensed temperature T is lower than the reference temperature $T_0$, a deviation $\epsilon$ is produced, so that the correction computing unit 73 calculates a correction value which reduces the set opening AN using a correction coefficient k to thereby cause the controller 76 to feed a control electric current to the proportional solenoid 14 in order to reduce the opening of the nozzle valve 11. Thus the opening area of the nozzle 4 is reduced, the resistance to flow of the melted resin and hence the frictional heat increase to raise the temperature of the melted resin to thereby increase the specific volume of the resin within the cavity 6.

When, the sensed temperature T is higher than the reference temperature $T_0$, the opening of the nozzle valve 11 and hence the opening area of the nozzle 4 are increased to reduce the resistance to flow of the melted resin to thereby reduce the frictional heat generated and to reduce the specific volume of the resin in contrast with the case just mentioned above.

As just described above, in the sixth embodiment, a change in the mold temperature is sensed, the heating value of the resin produced frictionally which is a factor of the same temperature is controlled in accordance with the sensed change in the temperature, namely, the frictional heating value of the melted resin is changed by adjusting the opening area of the nozzle 4 to control the temperature of the melted resin to thereby maintain the specific volume of the resin constant, so that molding is performed precisely in a stabilized manner to thereby successively provide moldings with stabilized quality. Since the pressure of the melted resin is not controlled, the distribution of the stress within the mold does not change to thereby prevent the production of bad moldings. In this control operation, the opening area of the nozzle 4 is only required to be changed, so that control is easy. Furthermore, it is not necessary to control the room temperature in the factory constant at a constant value, so that the apparatus is inexpensive.

INDUSTRIAL APPLICABILITY

This invention is applicable to injection molding machines wherein a plasticized plastic material is injected into the mold cavity through a nozzle section provided at a housing end by the movement of a screw in order to form plastic moldings.

We claim:

1. A control apparatus for an injection molding machine which injects a melted resin within a housing into a cavity of a mold through a nozzle section of a nozzle at a housing end by movement of a screw, comprising:
    nozzle opening changing means for variably changing a throttled path area of the nozzle;
    mold temperature sensing means for sensing temperature of the mold; and
    controlling means for controlling the nozzle opening changing means in accordance with the sensed temperature of the mold temperature sensing means.

2. A control apparatus according to claim 1, wherein the controlling means includes mold temperature setting means for setting a reference temperature for the mold, means for obtaining a deviation between the setting at the mold temperature setting and the sensed temperature of the mold temperature sensing means, and a controller for controlling the nozzle opening changing means in accordance with the deviation of said deviation obtaining means.

3. A control apparatus for an injection molding machine which injects a melted resin within a housing into a cavity of a mold through a nozzle at a housing end by a movement of a screw, comprising:
    nozzle opening changing means for variably driving a throttle path area AN of the nozzle;
    screw changing means for variably driving a moving velocity VS of the screw; and
    controlling means for calculating the throttled path area AN such that VS/AN becomes constant corresponding to the velocity VS inputted to the controlling means, and for outputting the value AN thus calculated into the nozzle opening changing means.

4. A control apparatus according to claim 3, wherein the moving velocity VS of the screw inputted to the controlling means is a target value inputted to the screw velocity changing means.

5. A control apparatus according to claim 3, wherein the moving velocity of the screw inputted to the controlling means is a detected value of the moving velocity of the screw.

6. A control apparatus according to claim 3, wherein the screw velocity changing means changes the moving velocity of the screw into a plurality of different velocities during one injection process.

7. A control apparatus for an injection molding machine which injects a melted resin within a housing into a cavity of a mold including a sprue, a runner, and a gate through a nozzle at a housing end by a movement of a screw, comprising:
    nozzle opening changing means for variably driving a throttle path area AN of the nozzle;
    screw velocity changing means for variably driving a moving velocity VS of the screw; and
    controlling means for calculating the throttled path are a AN of the nozzle such that $(B+AN^{-n})VS^n$ becomes constant, the moving velocity VS being inputted into the controlling means, where B is a total sum of sectional areas of throttled path areas in the sprue, the runner, and the gate, and n is a constant determined by a resin, and for outputting the value AN thus calculated into the nozzle opening changing means.

8. A control apparatus for an injection molding machine which injects a melted resin within a housing into a cavity of a mold including a sprue, a runner, and a gate through a nozzle at a housing end by a movement of a screw, comprising:
    nozzle opening changing means for variably driving a throttled path area AN of the nozzle;
    screw velocity changing means for variably driving a moving velocity VS of the screw; and
    controlling means for calculating the throttled path area AN of the nozzle such that $(B-r+AN^{-n})VS^n$ becomes constant, the moving velocity VS being inputted into the controlling means, where B is a total sum of sectional areas of throttled path areas in the sprue, the runner and the gate, r is drop in a resin temperature due to cooling down of the mold temperature, and n is thus calculated into the nozzle opening changing means.

9. A control apparatus according to claim 8, wherein the controlling means controls the throttled path area AN of the nozzle such that $(B-r+AN^{-n})VS^n$ becomes constant while variably controlling the r.

10. A control apparatus for an injection molding machine which injects a melted resin within a housing into a cavity of a mold through a nozzle at a housing end by a movement of a screw, comprising:
    nozzle opening changing means for variably driving a throttled path area AN of the nozzle;
    screw velocity changing means for variably driving a moving velocity VS of the screw; and
    controlling means for calculating the throttled path area AN of the nozzle such that $(-r+AN^{-n})VS^n$ becomes constant, the moving r is a drop in a resin temperature due to cooling down of the mold temperature and n is a constant determined by a resin, and for outputting the value AN thus calculated into the nozzle opening changing means.

11. A control apparatus according to claim 10, wherein the controlling means controls the throttled path area AN of the nozzle such that $(-r+AN^{-n})VS^n$ becomes constant while variably controlling the r.

12. A control apparatus for an injection molding machine which injects a melted resin within a housing into a cavity of a mold through a nozzle at a housing end by a movement of a screw, comprising:
    nozzle opening changing means for variably driving a throttled path area AN of the nozzle;
    resin temperature detecting means for detecting a resin temperature; and
    controlling means for calculating the throttled path area AN such that the detected resin temperature becomes constant, and for outputting the value AN thus calculated into the nozzle opening changing means.

13. A control apparatus according to claim 12, wherein the resin temperature detecting means detects a temperature of a resin after the resin has passed through the nozzle.

14. A control apparatus according to claim 12, wherein the resin temperature detecting means detects a temperature of a resin being within the mold.

15. A control apparatus for an injection molding machine which injects resin within a housing into a cavity of a mold through a nozzle at a housing end by a movement of a screw, comprising:
   nozzle opening changing means for variably driving a throttled path area AN of the nozzle;
   differential pressure detecting means for detecting resin pressures at front and back ends of the nozzle, respectively, to obtain a differential pressure of the front and back pressures; and
   controlling means for calculating the throttled path area AN such that the selected differential pressure becomes constant, and for outputting the value AN thus calculated into the nozzle opening changing means.

16. A control apparatus for an injection molding machine which injects a melted resin within a housing into a cavity of a mold through a nozzle at a housing end by a movement of a screw, comprising:
   nozzle opening changing means for variably driving a throttled path area of the nozzle;
   screw velocity changing means for variably driving a moving velocity VS of the screw;
   nozzle opening setting means for setting a target value AN for a nozzle opening inputted into the nozzle opening changing means; and
   controlling means for calculating the moving velocity VS of the screw such that VS/AN becomes constant corresponding to the target value AN inputted to the controlling means, and for inputting the value VS thus calculated into the screw opening changing means.

* * * * *